(12) United States Patent
Weinhold

(10) Patent No.: US 8,956,142 B2
(45) Date of Patent: Feb. 17, 2015

(54) METHOD AND DEVICE FOR PRODUCING STRAND-SHAPED GOODS

(75) Inventor: Jens Weinhold, Chemnitz (DE)

(73) Assignee: Oerlikon Textile Gmbh & Co. KG, Remscheid (DE)

( * ) Notice: Subject to any disclaimer, the term of this patent is extended or adjusted under 35 U.S.C. 154(b) by 705 days.

(21) Appl. No.: 13/130,503

(22) PCT Filed: Nov. 4, 2009

(86) PCT No.: PCT/EP2009/064573
§ 371 (c)(1),
(2), (4) Date: Jul. 26, 2011

(87) PCT Pub. No.: WO2010/060760
PCT Pub. Date: Jun. 3, 2010

(65) Prior Publication Data
US 2013/0193609 A1    Aug. 1, 2013

(30) Foreign Application Priority Data

Nov. 25, 2008   (DE) .......................... 10 2008 059 008

(51) Int. Cl.
*B29C 47/88* (2006.01)
*B29C 47/00* (2006.01)
*B29C 55/06* (2006.01)
*D01D 10/02* (2006.01)
*B29D 7/01* (2006.01)

(52) U.S. Cl.
CPC ......... *B29C 47/8805* (2013.01); *B29C 47/0021* (2013.01); *B29C 55/06* (2013.01); *D01D 10/02* (2013.01); *B29D 7/01* (2013.01); *B29C 47/00* (2013.01)
USPC ....................................... 425/377; 425/378.1

(58) Field of Classification Search
USPC ................. 425/71, 67–68; 264/178 R, 178 F, 264/211.12–211.15, 211.17–211.18, 211.2
See application file for complete search history.

(56) References Cited

U.S. PATENT DOCUMENTS 4,295,033 A * 10/1981 Lindgren et al. .............. 219/388
4,683,094 A *  7/1987 Sharps, Jr. .................. 264/37.24
(Continued)

FOREIGN PATENT DOCUMENTS

DE       197 49 564      5/1999
DE       102 41 371      3/2003
(Continued)

OTHER PUBLICATIONS

English abstract of JP2000136441.*
(Continued)

*Primary Examiner* — Larry Thrower
*Assistant Examiner* — Xue Liu
(74) *Attorney, Agent, or Firm* — Alston & Bird LLP

(57) ABSTRACT

The invention relates to a method and to a device for producing strand-shaped goods in the form of small bands, fiber strands, monofilaments, or films, which are extruded from a polymer melt. After cooling in a cooling bath, a thermal treatment occurs between rolling feed units, wherein the goods are brought into contact with a hot medium. In order to be able to perform an individual thermal treatment depending on the thermoplastic material, the hot medium is provided optionally in the form of hot air or hot water according to the invention. For this purpose, the heating apparatus is formed from a forced-air oven and a water bath apparatus, which can be optionally activated to thermally treat the goods.

3 Claims, 4 Drawing Sheets

(56) References Cited

U.S. PATENT DOCUMENTS 5,451,461 A     9/1995    Broyer
6,719,935 B2 *   4/2004    Tunc ............................ 264/40.7

FOREIGN PATENT DOCUMENTS

| EP | 0 687 545 | 12/1995 |
| JP | 2000136441 A * | 5/2000 |
| WO | WO 2006/105079 | 10/2006 |

OTHER PUBLICATIONS

International Search Report for International Application No. PCT/EP2009/064573.

* cited by examiner

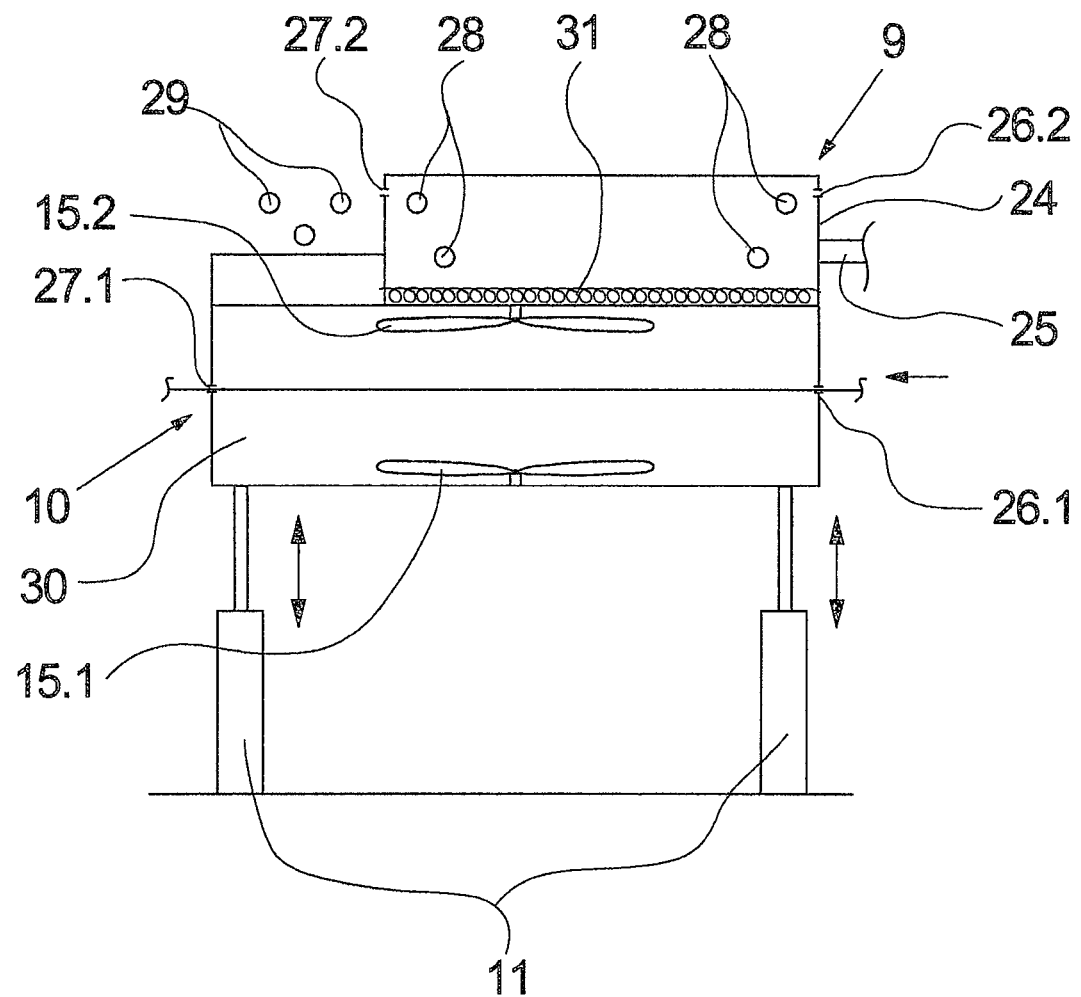
Fig. 2.1

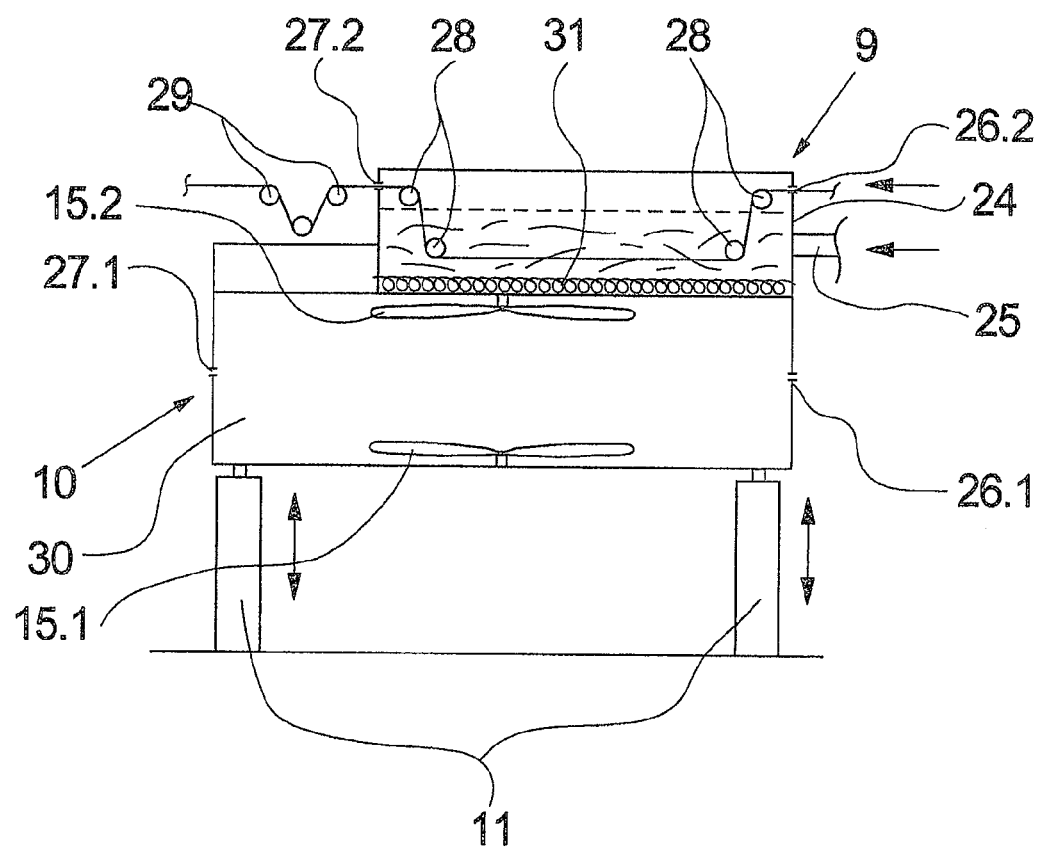
Fig. 2.2

METHOD AND DEVICE FOR PRODUCING STRAND-SHAPED GOODS

BACKGROUND OF THE INVENTION

1. Field of the Invention

The invention concerns a method for production of strand-like goods in the form of strips, fiber strands, monofilaments or films and a device for performance of the method.

2. Description of Related Art

A generic method and a generic device are known, for example, from DE 102 41 371 A1.

In the known method and known device a number of film strips are produced from an extruded film. The film is extruded from a polymer melt and cooled in a water bath. The film is cut into a number of strips after cooling. The film strips are drawn together as an assemblage through roll delivery systems and stretched between adjacent roll delivery systems. For stretching the film strips are passed through a heating device in which the film strips are heated by means of hot air to a stretching temperature. The heat treatment performed on the film strips is adjusted to the product being produced and especially to the thermoplastic material from which the film strips are formed.

Depending on the material and condition of the goods being produced, it is also common to carry out heat treatment in strand-like products made of thermoplastic material with a hot water bath. For this purpose, water bath devices containing hot water through which the strand-like strips or films are passed are ordinarily used. To this extent devices are only known in the prior art in which the heating devices permit either hot air heating or hot water heating.

It is therefore the task of the invention to modify a method of the type just mentioned, as well as a device of the described generic type so that heat treatment can be executed on the strand-like products with maximum flexibility.

A further objective of the invention is to provide a method and device of the generic type with which different thermoplastic materials can be produced individually to strand-like goods.

SUMMARY OF VARIOUS EMBODIMENTS

The task is solved according to the invention for a method in that the hot medium for heat treatment of the goods is alternately provided in the form of hot air or in the form of hot water. For a device the task is solved in that the heating device is formed by a forced air oven and the water bath device, in which case the forced air oven or the water bath device can be activated in alternation for heat treatment of the goods.

Advantageous modifications of the invention are defined by the features and feature combinations of the various embodiments described herein.

The invention is characterized by the fact that, in large installations for production of strand-like goods in the form of strips, fiber strands, monofilaments or films, flexible heat treatment of the goods can be conducted without any retrofitting. The method according to the invention is therefore particularly suited for optimal production of strand-like goods from different polymer materials in one installation.

The device according to the invention possesses the additional advantage that heat treatment of the goods can be switched from hot air treatment to water treatment or vice versa without any retrofitting.

During production of strand-like goods from an extruded thermoplastic polymer melt the goods are heated both for stretching and for relaxation treatment. For this purpose guiding of the strand-like goods guided as a broad sheet is defined by discharge of the goods on a roll delivery system and feed in an adjacent roll delivery system. To this extent the method variant is particularly advantageous in which the goods are guided for heat treatment in a treatment plane that extends between the roll delivery systems.

In order to permit both hot air heating or hot water heating independently of the treatment plane defined by the roll delivery systems, according to a preferred method variant the hot air is furnished by a forced air oven and the hot water by a water bath, which are held in alternation in the treatment plane by a height adjustment.

For this purpose a forced air oven and a water bath device are arranged one above the other in the heating device, the heating device being designed height-adjustable. The forced air oven or the water bath device can therefore be positioned in alternation in the treatment plane.

In order to obtain uniform heating of the strand-like goods during heat treatment, according to an advantageous method variant the strand-like goods are exposed on all sides to hot air or hot water. In particular, uniform heating can then be achieved on a top or bottom of the goods guided as a strand.

For this purpose the modification of the device according to the invention is preferred in which the forced air oven has at least two fans, one of the fans being arranged in one operating position of the forced air oven above the treatment plane and the other fan being arranged beneath the treatment plane.

In order to be able to conduct rapid switching between hot air treatment and hot water treatment, according to an advantageous modification of the device according to the invention the water bath device is designed with a container that is connected to a water source via at least one line and has at least one heating agent. Hot water through which the strand-like goods can be passed can therefore be generated before startup of the water bath device.

The method according to the invention and the device according to the invention can be used, in particular, with a heating device according to the invention in which a forced air oven contains a heating channel with an inlet opening and an outlet opening to guide the strand-like goods. According to the invention a water bath device is assigned to the forced air oven, which has a second inlet opening and a second outlet opening to guide the strand-like goods.

The forced air oven and the water bath device are held one above the other and designed height-adjustable together so that, depending on the choice of heat treatment, either the inlet opening and the outlet opening of the forced air oven are held in a treatment plane or the inlet opening and the outlet opening of the water bath device are held in the treatment plane.

In this case the modification of the heating device is preferably used in which the forced air oven has at least two fans and in which one of the fans is arranged above the heating channel and the other fan below the heating channel. Hot air is therefore generated on both sides of the strand-like goods guided as a broad sheet.

BRIEF DESCRIPTION OF THE SEVERAL VIEWS OF THE DRAWINGS

The invention is further described below by means of a practical example of the device according to the invention with reference to the appended drawings.

In the drawings

DETAILED DESCRIPTION

Figure 1:
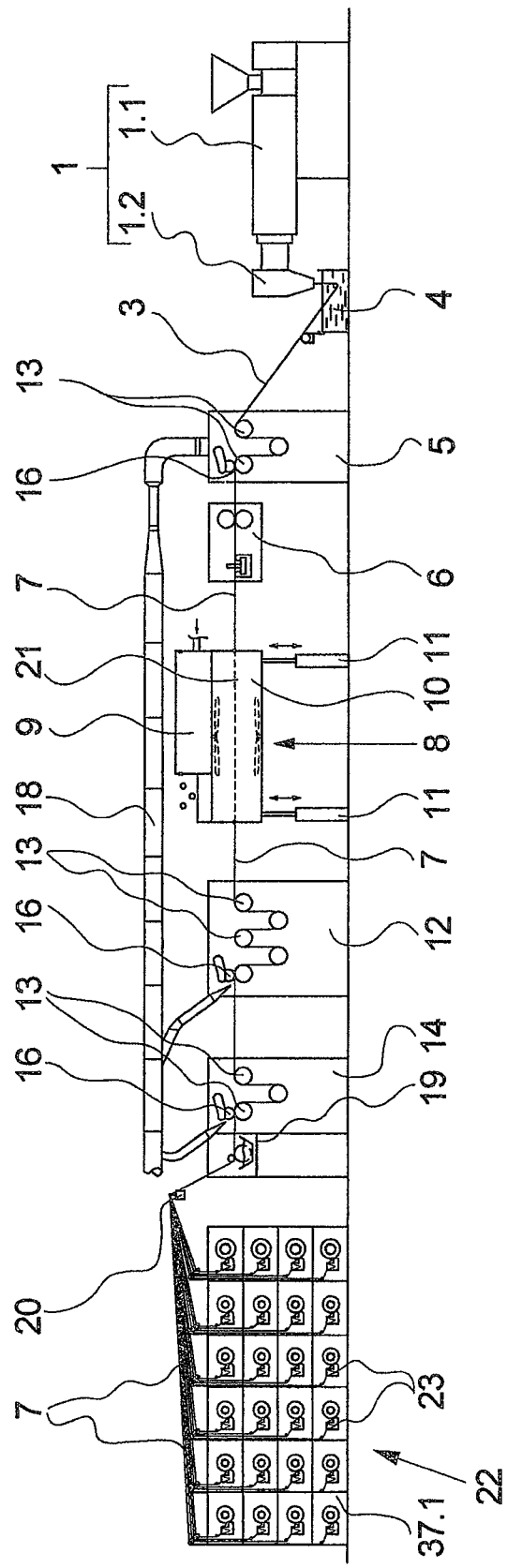
FIG. 1 schematically depicts a view of a practical example of the device according to the invention for performance of the method according to the invention FIG. 2 schematically depicts a practical example of the heating device according to the invention as used in the device according to the invention according to FIG. 1

A practical example of a device according to the invention for performance of the method according to the invention is schematically depicted in a view in FIG. 1. The practical example concerns an installation for production of film strips from an extruded film.

For this purpose, a spinning device 1 is formed from an extruder 1.1 and a spinning head 1.2. The spinning head 1.2 contains an extrusion die in order to extrude a film from a thermoplastic melt fed through extruder 1.1. In this case the extruded film 3 enters a cooling bath 4 arranged beneath the spinning head 1.2 so that the film 3 is solidified on its surface. The film 3 is sent to a cutting device 6 via a first roll delivery system 5. The first roll delivery system 5 has several driven rolls 13 for this purpose, on whose periphery the film is guided with partial wraparound.

Individual blades in the cutting device 6 enter the film 3 in order to cut the film sheet into an assemblage of film strips 7. The film strips 7 for this purpose are pulled by a second roll delivery system 12 arranged down-line from the cutting device 6. The second roll delivery system 12 also has several driven rolls 13, which are driven with higher peripheral speed than the rolls of roll delivery system 5 so that the film strips 7 are stretched.

A heating device 8 is arranged between the roll delivery systems 5 and 12 for stretching. The heating device 8 has a forced air oven 10 and a water bath device 9, which are arranged one above the other in the heating device 8. The heating device 8 is designed height-adjustable so that the circulating air of oven 10 or the water bath device 9 can be positioned in alternation in a treatment plane 21 defined by the roll delivery systems 5 and 12. In the practical example depicted in FIG. 1 the forced air oven 10 is arranged in the treatment plane 21 so that the film strips 7 are heated by means of hot air.

An additional third roll delivery system 14 is arranged downstream of the second roll delivery system 12, which guides the film strip 7 to a winding device 12. The third roll delivery system 14 also has several driven rolls 13 that are wrapped around by the strip assemblage.

The roll delivery systems 5, 12 and 14 each have a pressure roll 16 mounted to pivot on the last roll 13, through whose normal force the film or film strips 7 are pressed against the corresponding rolls and the holding and stretching force is established in conjunction with wraparound. A suction device 18 is connected to the second roll delivery system 12 and the third roll delivery system 14, from which the film strips are initially drawn by suction during startup of the installation, i.e., during positioning of the individual film strips. Because of this even the strips torn off during operation are withdrawn by suction so that no jams can be formed on the rolls.

A winding device 22 is arranged at the end of the device according to the invention. A preparation device 19 is provided between the winding device 22 and the last roll delivery system 14, through which the film strips are wetted with a preparation agent before winding into spools.

The winding device 22 has a machine frame, in which a number of winding sites 23 are arranged above and next to each other. In each of the winding sites one of the film strips is wound to a spool. Distribution of the film strip 7 to the winding sites 23 occurs through a thread guide strip 20 and the thread guides assigned to the winding sites 23.

The devices shown for treatment and guiding of the film strip 7 in the practical example according to FIG. 1 are only examples. In principle, additional treatment steps of treatment devices could be provided in order to be able to conduct additional treatment steps, depending on the material and type of strip. For example, it is common to execute relaxation treatment between the second roll delivery system 12 and the last roll delivery system 14. In this case the film strips 7 are ordinarily heated so that an additional heating device could be arranged between the two roll delivery systems 12 and 14. For example, the heating device 8 could be used without problem for heat treatment in the relaxation zone.

In order to be able to carry out heat treatment alternately with hot air or hot water the heating device 8 is formed by a forced air oven 10 and a water bath device 9.

A practical example of such a heating device according to the invention is schematically depicted in FIG. 2 in a cross-sectional view. The heating device in FIG. 2.1 is shown in a first operating position in which the film strips are heated with hot air. The heating device is shown in FIG. 2.2 in a second operating position in which the film strips 7 are heated by hot water. To this extent the following description of the heating device applies for both figures.

The heating device in this practical example is formed by a forced air oven 10 and a water bath device 9 arranged one above the other. The water bath device 9 is thus arranged directly above the forced air oven 10. A height adjustment device 11 is assigned to the forced air oven 10 and the water bath device 9, which is formed in this practical example by several lifting cylinders.

The forced air oven 10 has an elongated heating channel 30, which extends between an inlet opening 26.1 and an outlet opening 27.1. The inlet opening 26.1 is formed slit-like on one end of the forced air oven 10 in order to be able to guide an assemblage of strips in a treatment plane. On the opposite end of the forced air oven 10 the outlet opening 27.1 is correspondingly formed. Two fans 15.1 and 15.2 are provided within the forced air oven 10 in order to uniformly distribute hot air generated within the oven. The fan 15.1 is arranged above the heating channel 30 and the fan 15.2 beneath the heating channel 30. The strand-like goods can therefore be uniformly heated within forced air oven 10 from the top and a bottom.

The water bath device 9 in this practical example is formed by a container 24 having at least one water connection 25. A connection to a water source (not shown here) is possible above the water connection 25 so that fresh water can be introduced to container 24. A heating agent 31 is provided within container 24 in order to heat the fresh water introduced in container 24. In the upper area of the container 24 an inlet opening 26.2 is formed on one end and on the opposite side an outlet opening 27.2. The inlet opening 26.2 and the outlet opening 27.2 within the container 24 are assigned several deflection rolls 28 in order to guide an assemblage of strips or a film through the hot water of container 24 for heat treatment.

Several stripping rolls 29 are provided on an outlet side of container 24 in order to strip off the water adhering to the strips or film.

The heating device is depicted in FIG. 2.1 in a first operating position with activated forced air oven 10 in which the strand-like goods are guided over the first inlet opening 26.1 into the interior of forced air oven 10. The forced air oven 10 is positioned via the height adjustment device 11 so that the inlet opening 26.1 and the outlet opening 27.1 lie in a treatment plane. This situation is also shown, for example, in the practical example of the device according to the invention according to FIG. 1. In this operating position the strand-like material is heated by hot air. Depending on the type of treatment, whether stretching or relaxation is required, the temperature of the forced air oven 10 can be adjusted. The water bath device 9 is deactivated in this operating position so that no water is supplied.

The heating device is shown in FIG. 2.2 in a second operating position with activated water bath device 9 in which the water bath device 9 is arranged with its inlet opening 26.2 and its outlet opening 27.2 in the treatment plane in order to heat the supplied strand-like goods with hot water. For this purpose water is introduced to container 24 and heated via heating device 31 to a predetermined temperature. In this situation the forced air oven 10 is deactivated. Heat treatment occurs exclusively through the water bath device 9.

The heating device depicted in FIG. 2 is therefore particularly suited to carry out heat treatment alternately with hot air or hot water in the practical example shown in FIG. 1.

Figure 3:
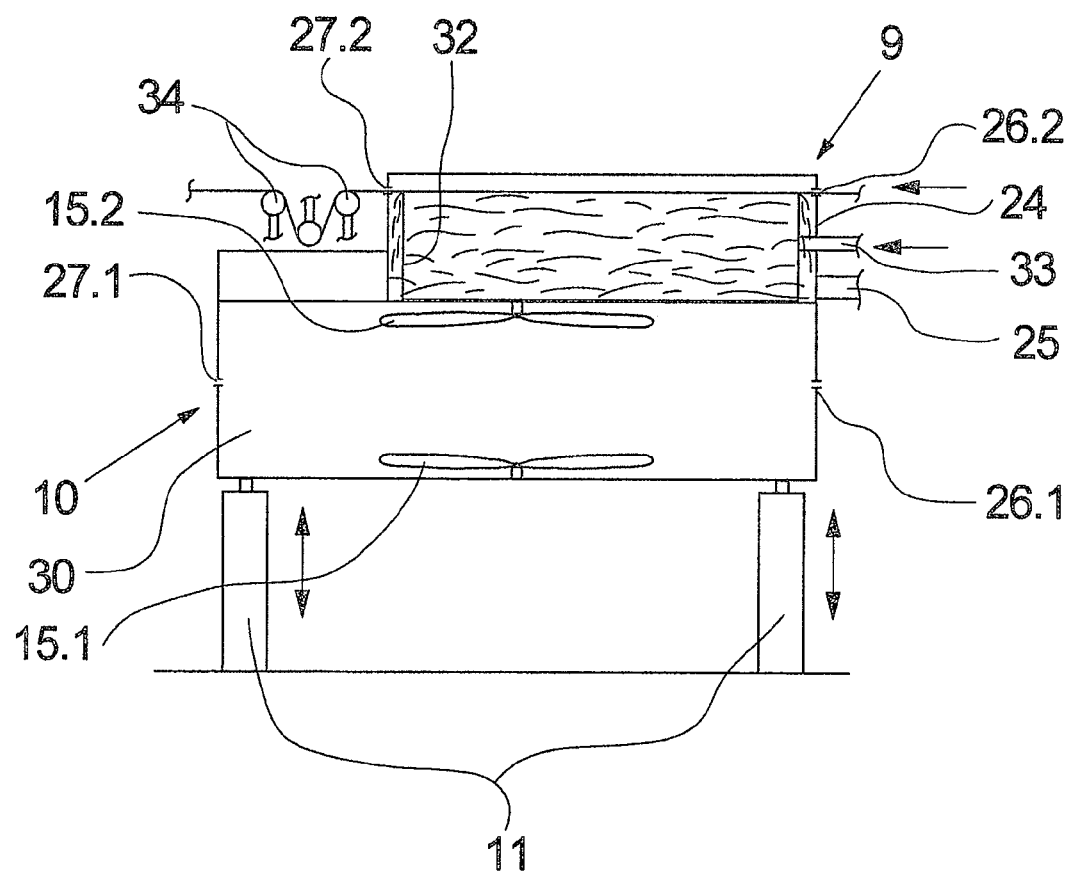
FIG. 3 schematically depicts another practical example of the heating device according to the invention as used in the device according to the invention according to FIG. 1

Another practical example of a heating device 8 is shown in FIG. 3, as could be used in the practical example of the device according to the invention according to FIG. 1. The practical example of the heating device according to FIG. 3 is essentially identical to the practical example of the heating device according to FIG. 2. Only the difference between the two practical examples is therefore explained here and otherwise reference is made to the aforementioned description.

The practical example of the heating device is formed by a water bath device 9 and a forced air oven 10. Both devices can be held alternately in the thread path by height adjustment device 11. FIG. 3 shows the situation in which the film strips 7 are heated by the water bath device 9.

For this purpose the water bath device 9 has an overflow container 32, which forms a treatment plane with its upper opening in which the film strips 7 are guided. The overflow container 32 is arranged within the container 24 so that hot water continuously emerging from the overflow container 32 is collected in the container 24. The overflow container 32 and container 24 are connected in circulation to supply and prepare hot water. The overflow container 32 is therefore supplied through a water feed 33 with hot water. Container 24 is connected via water connection 25 to a return line not shown here.

The container 24 on the opposite sides has an inlet opening 26.2 and an outlet opening 27.2 to guide the film strips, which form the treatment plane with the edge of the overflow container 32. The film strips 7 are guided by the natural rise in water level that is necessarily set in the overflow container 32 during overfilling. The film strips can therefore be guided through the water bath in a straight thread path.

Several suction connectors 34 are provided on the outlet side of the water bath device 9, at which the film strips 7 are brought into contact. The suction connectors 34 have slit-like openings in order to draw off the adhering liquid by suction from the film strips. The suction connectors 34 are connected for this purpose to a suction device.

The water bath device and the forced air oven in the heating devices depicted in FIGS. 2 and 3 have pronounced heating zones of different length because of the different heat transfer. The treatment zone in the water bath device is made much shorter because of another heat transfer than in the forced air oven. Both practical examples are therefore suitable for heat treatment in the device according to the invention.

The practical example of the device according to the invention depicted in FIG. 1 can also be advantageously used in order to produce a number of monofilaments. For this purpose the spinning head 1.2 contains a spinneret with a number of nozzle openings so that individual monofilaments can already be extruded.

It is also possible that the extruded film is not cut in two strips within the device but produced as a flat film and wound. To this extent the invention applies to all devices that produce a strand-like good from an extruded thermoplastic material and execute heat treatment on the strand-like goods between roll delivery systems.

The invention claimed is:

1. A device for production of strand-like goods in the form of strips, fiber strands, monofilaments or films, the device comprising:
   a melt spinning device;
   a cooling device;
   several roll delivery systems; and
   a heating device between the roll delivery systems,
   wherein the heating device is formed by a forced air oven and a water bath device, in which the forced air oven or the water bath device can be activated in alternation for heat treatment of the goods, wherein the forced air oven or the water bath device can alternately be positioned in a treatment plane extending between the roll delivery systems, and wherein the forced air oven and the water bath device are arranged one above the other in the heating device, and wherein the heating device is configured to be height-adjustable.

2. The device according to claim 1, wherein the forced air oven has at least two fans, in which one of the fans is arranged above the treatment plane in one treatment position of the forced air oven and the other fan is arranged beneath the treatment plane.

3. The device according to claim 1, wherein the water bath device has a container, which is connected to a water source via at least one water connection and which has at least one heating device.

* * * * *